Figure 1:
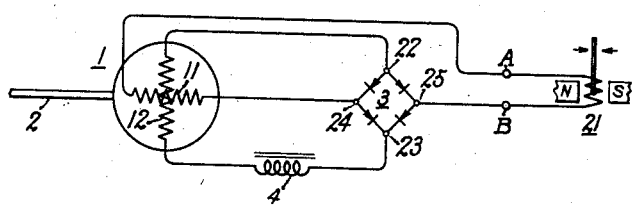

Feb. 9, 1943.    R. BUCH ET AL    2,310,511
DIRECTIONALLY RESPONSIVE ALTERNATING CURRENT TACHOMETER
Filed Nov. 22, 1941

Inventors:
Rudolf Buch,
Friedrich Haemmerling,
by Harry E. Dunham
Their Attorney.

Patented Feb. 9, 1943

2,310,511

UNITED STATES PATENT OFFICE 2,310,511

DIRECTIONALLY RESPONSIVE ALTERNATING CURRENT TACHOMETER

Rudolf Buch and Friedrich Haemmerling, Berlin-Charlottenburg, Germany, assignors to General Electric Company, a corporation of New York Application November 22, 1941, Serial No. 420,112
In Germany February 13, 1940

10 Claims. (Cl. 171—97)

Our invention relates to current responsive apparatus and concerns particularly apparatus for producing an electrical quantity which is responsive to speed and varies in polarity with change in direction of speed.

It is an object of our invention to provide apparatus for producing speed-dependent directional quantities for producing indications, for control, or for driving objects at a distance.

It is also an object of our invention to provide a directional tachometer employing alternating current generator windings and obviating the need for either slip rings or commutators.

In carrying out our invention in its preferred form we provide an alternating current generator as a tachometer having two output windings which are displaced in space phase by 90 electrical degrees with respect to each other, and we utilize a full wave rectifier bridge with one of the generator windings connected thereto as a control winding with reactance in series and the other of the generator windings connected through the rectifier to the output terminals for energizing a polarized current or voltage responsive device.

When driving objects, especially when controlling testing devices over a distance and as a function of the motion of a transmitter, it is frequently desirable to use control quantities which represent a measure or criterion of the adjusting speed, just prevailing, of the transmitter or of the adjusting device or of both. For producing such control quantities, it has been customary so far to use direct-current tachometers whose voltages can be easily introduced in known control circuits. Regardless of the high control accuracy which can be attained with such direct-current tachometers, their application has the disadvantage that the direct-current machines require tending (one need only think of the maintenance which the commutator and brush construction entail), and that, when they are to be built for small systems, they become more expensive and difficult to manufacture than if corresponding alternating-current machines were used. In view of the advantages in manufacture, and in view of the possibility of making such additional control machines as small as possible, it seems, therefore, desirable to use alternating-current tachometers for such control circuits. Alternating-current tachometers are known. However, in adjusting devices which act as a function of the motion of a transmitting mechanism, in which therefore the adjusted object is to follow the transmitter in each of its motions, as a function of the angle differences and of the velocity differences, we are confronted with the following problem: The regulating quantity which depends upon the velocity must have an adjusting effect in one sense or the other, and that in accordance with the sense of rotation of the control shaft, that is to say, depending upon whether the transmitter or the receiver has a higher speed at that particular moment. An ordinary alternating current generator, or an alternating current tachometer is ineffective for such controlling circuits for it does not provide any differentiation in changing direction of rotation of the generator.

Accordingly, it is an object of our invention to provide an improved design and method of connecting alternating current tachometer machines which permits producing by means of an alternating current tachometer a control quantity which depends upon the velocity and which changes its direction depending upon the sense of rotation of the tachometer machine, and which therefore depends in the same manner upon the rotational speed and the sense of direction of rotation of the control shaft as a direct potential of a direct current tachometer machine.

In carrying out our invention in its preferred form we employ an alternating current tachometer machine having two windings which are electrically displaced with respect to each other, that is, displaced in space phase, preferably by 90 degrees. One of the tachometer windings serves for supplying the desired control voltage by way of a full wave rectifier and the second alternating current tachometer winding controls the full wave rectifier as a function of the phase in such a way that in one sense of rotation of the shaft the direct potential produced by way of the rectifier assumes positive values, while in the opposite sense of rotation that direct potential assumes negative values, whose magnitude depends each time on the R. P. M. of the shaft. To this end a reactor has been inserted in the circuit of the second winding of the alternating-current tachometer (the winding which is displaced by 90 degrees) and this reactor has the purpose of displacing the alternating current of the second winding with respect to the driving alternating potential by 90 degrees, lagging. As a result, the alternating current which controls the rectifier bridge will be, depending on the sense of rotation of the shaft, in phase, or in phase opposition with the voltage of the first winding. Thus the rectifier can be so controlled that in one sense of rotation only the negative half-waves of the regulating alternating potential are rectified, and are applied to the control circuit in the form of a positive or negative regulating potential which depends upon the R. P. M.

A better understanding of the invention will be afforded by the following detailed description considered in connection with the accompanying drawing, and those features of the invention which are believed to be novel and patentable will be pointed out in the claims appended hereto.

Figure 2A:
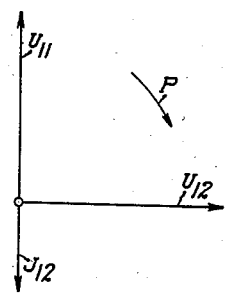
Figure 2B:
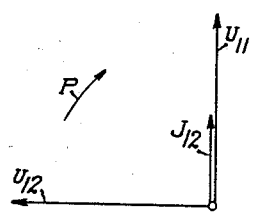
Figure 3:
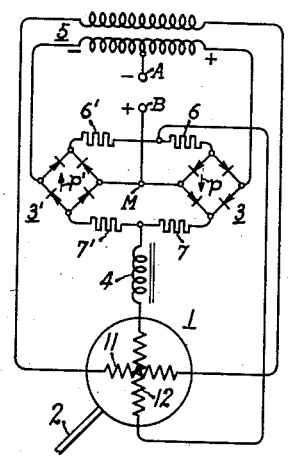

In the drawing Fig. 1 is a circuit diagram schematically representing one embodiment of our invention and illustrating the basic principle involved; Figs. 2a and 2b are vector diagrams explaining the current and voltage relationships for opposite directions of rotation, and Fig. 3 is a circuit diagram representing a more efficient embodiment of our invention than the basic arrangement illustrated in Fig. 1.

Like reference characters are used throughout the drawing to designate like parts.

We shall first describe with reference to the circuit of Fig. 1 and the vector diagrams of Figs. 2a and 2b the basic design and the principle of operation of an arrangement which embodies our invention.

In Fig. 1 there is shown an alternating current tachometer 1 which is mounted upon a shaft 2 to be controlled or the speed of which is to be indicated. The tachometer has a pair of output windings 11 and 12 which are displaced in space phase with respect to each other by 90 degrees. The winding 11 furnishes a tachometer voltage properly speaking, and which is to be applied, properly rectified, and with a sign dependent on the sense of rotation, to the control circuit (connected to terminals A, B) by way of a controlled fullwave rectifier bridge 3. To this end the rectifier bridge 3 is controlled by a current which is forced through a reactor 4 by the alternating potential generated in winding 12. If this alternating current lags by 90 degrees behind the voltage of winding 12, then the conditions represented in Fig. 2 are obtained. In this figure, vector $U_{11}$ represents the voltage of winding 11 of the tachometer machine. For the sense of rotation of the time vector, which vector is represented by the arrow P in Fig. 2a, the voltage of winding 12, which owing to the spatial arrangement of the windings is 90 degrees out of phase, is represented by the vector $U_{12}$, assuming that the control shaft rotates counterclockwise. The control current of the rectifier bridge, current $J_{12}$, which according to our assumption lags by 90 degrees with respect to the voltage $U_{12}$, will be displaced with respect to voltage $U_{11}$ and will therefore have a phase displacement of 180 degrees with respect to voltage $U_{11}$, an ohmic load being assumed in this case.

On the other hand, if the controlled shaft rotates clockwise, then with the same sense of rotation of the time vector, arrow P, the voltage $U_{12}$ will, according to Fig. 2b, lead the voltage $U_{11}$ by 90 degrees, and as a result the current $J_{12}$, which lags by 90 degrees with respect to voltage $U_{12}$, will have the same phase as voltage $U_{11}$, in the case of a clockwise rotation.

Hence, if the voltage $U_{11}$ is applied to the rectifier bridge controlled by the current $J_{12}$, the latter will let pass only the positive half-waves, in the case, of, say, a clockwise rotation of shaft 2, while in the case of the counterclockwise rotation of shaft 2, it will let pass only the negative half-waves of voltage $U_{11}$, so that it will produce an outgoing direct potential which assumes positive values with the clockwise rotation of shaft 2, and negative values with the counterclockwise rotation of shaft 2.

A suitable voltage or current responsive device 21 is connected to the output terminals A, B of the speed responsive apparatus. The device 21 is one responsive to the direction of current flow as well as its magnitude such as a polarized relay or a zero center direct current measuring instrument for example. The rectifier 3 consists of four rectifier elements connected in series parallel with all of the elements so connected as to pass current in a given direction through the reactor 4 and the rectifier control winding 12 of the generator. Thus, the rectifier 3 has a pair of terminals 22 and 23 of opposite polarity serving as unidirectional current passing terminals in series with the reactor 4 and the winding 12. The rectifier has also a second pair of terminals 24 and 25 in the circuit of the regulating winding 11 of the generator, the rectifier terminals 24 and 25 normally serving for opposing or blocking the flow of current in the circuit of the winding 11 and the current responsive instrument 21.

One way of looking at the manner of operation of the apparatus illustrated in Fig. 1 is to take into consideration that during the portion of the alternating wave when current is flowing through the reactor 4 and the rectifier 3 by way of the unidirectional current passing terminals 22 and 23, the remaining two terminals 24 and 25 are at substantially the same potential. Accordingly, the potential difference between the ends of the winding 11 may be expected to reappear at the terminals A and B. On the other hand, when no current is flowing through the reactor 4 through the energization of the generator winding 12, only a very circuitous current path can be found through the instrument 21 and the generator winding 11. If one attempts to trace such a circuit from the output terminal A, for example, through the winding 11 to the rectifier terminal 24 through one of the rectifier elements to the rectifier terminal 23 through the reactor 4, the generator winding 12, the rectifier terminal 22, one of its elements to the rectifier terminal 25 and back to the remaining output terminal B, one encounters the voltage drop occurring not only in the impedances 4 and 12, but also in the two rectifier elements between the terminals 24 and 25 and between the terminals 22 and 25. For relatively low currents, rectifier elements, such as those employed in dry rectifiers, have an appreciable impedance even in the direction of current flow. Consequently, the circuit of Fig. 1 provides a decided directional effect at the output terminals A, B according to whether the reactance 3 is conducting current during one-half cycle or another of the voltage waves in the winding 11. In order to enhance the efficiency of our invention, we may employ rectifier elements having finite resistance in the conducting direction.

Another way of looking at the operation of the apparatus of Fig. 1 is to consider the difference in the impedance of the rectifier elements with variations in current and with regard to whether the applied voltage is in one direction or the other. Looked at in this way the voltage drop between the terminals of the rectifier elements serves to provide the directional effect. This results because the voltage drop with respect to the circuit of the output terminals A, B when the winding 12 is passing current through the rectifiers and the reactance 4 is considerably different from that when such current is not flowing.

A greater efficiency and reliability is obtained by modifying the basic circuit of Fig. 1 in order to employ a pair of full wave rectifier elements as illustrated in Fig. 3. While the rectifier bridge 3 in Fig. 1 utilizes both half waves of the alternating current potential produced in winding 11, and utilizes them depending upon the sense of rotation, this bridge constitutes for the circuit of winding 12 a half-wave rectifier. In this circuit, the reactor 4 carries also a direct current component, so that no pure alternating current can form itself in the reactor. As a result, the phase displacement between the current applied to the control bridge 3, and the voltage of winding 12, will remain less than 90 degrees. The desired control effect illustrated in Fig. 2, as far as the circuit of winding 12 is concerned, is increased when a double-bridge arrangement, such as provided in Fig. 3, is applied. This permits the unimpeded formation of the alternating current in the circuit of reactor 4. In this arrangement, the parallel connection of two control bridges, 3 and 3', is introduced in the circuit of winding 12 and of reactor 4; this parallel connection supplants the one control bridge 3, shown in Fig. 1, and the two bridges 3 and 3' have, with respect to the circuit of reactor 4, opposite directions of passage, as shown by the arrow $p$, $p'$. The voltage of the winding 11 is applied to the rectifier bridges by way of a transformer 5, whose secondary winding, which is tapped at the center, is connected to the two bridges according to a full-wave rectifier circuit; that is to say, the two bridges are connected together in series, with respect to the secondary winding of transformer 5, and the conductor at the point M between the two bridges is connected to the center of the secondary winding of transformer 5 by way of the control apparatus (terminals A, B).

This arrangement operates as follows: As regards the circuit of reactor 4, a pure alternating current can form itself in that circuit, and the half-wave of that alternating current suppressed in Fig. 1 is allowed to pass through bridge 3'. In order to get an idea of the mode of operation of the control bridges as regards passing of the voltages supplied by winding 11, we will assume first that in the case of a clockwise rotation of shaft 2, the control current of bridges 3 and 3', which lags by 90 degrees with respect to the voltage of winding 12, owing to reactor 4, is in phase with the alternating potential of winding 11, referred to the current circuit of the control bridges. In this case the polarity indicated in the drawing at the secondary winding of transformer 5 will occur each time the alternating current of the reactor circuit flows through bridge 3, while the opposite polarity prevails in those instants when the reactor current completes its circuit in the opposite direction by way of bridge 3'. The first half-wave of the alternating potential to be controlled is allowed to pass to point M by the bridge 3, which represents a by-pass, and the second half wave is allowed to pass through the bridge 3', which immediately afterwards likewise forms a by-pass. Both half waves produce thus a voltage of the indicated polarity at terminals A, B that is to say, a direct potential whose magnitude depends on the amplitude of the alternating potential in winding 11, e. g., on the R. P. M. of shaft 2.

In the case of a counterclockwise rotation of the shaft, the control current of the reactor circuit 4 is 180 degrees out of phase, compared to the first state that was observed. This signifies that in the time intervals when the polarity indicated in Fig. 3 prevails at the secondary winding of transformer 5, the bridge 3' will be unblocked, while at the opposite polarity of the transformer the bridge 3 will form a by-pass. In this case, both half-waves of the alternating potential of transformer 5 will be allowed to pass, each time, on the path opposite that of the case that was first considered. They produce, therefore, at terminals A, B a direct potential, whose polarity is opposite that shown in the drawing, and whose magnitude depends on the R. P. M. of the shaft 2.

The accuracy of the operation of the arrangement may be assured by inserting resistance 6, 6' and 7, 7' in the connections between the current circuit of the reactor 4 and the two bridges 3 and 3'. These resistances make it possible to maintain an opposing voltage, due to the voltage drop of the reactor circuit, which opposing voltage prevails between the terminals of the secondary winding of transformer 5, in each operating state, and prevents a short circuit of transformer 5. It goes without saying that the voltages which are applied to the bridge system, once from the reactor circuit and the other time from the transformer 5, must be so gauged that the transformer voltage remains smaller than the voltage drop, which is produced by the reactor current, and which blocks each time the by-passing of the transformer circuit. Hence, in order to keep the reactor current always at the desired level, it may be advantageous, to saturate the reactor more or less. In this case the current of the reactor circuit will likewise rise with increasing frequency, that is to say, with an increasing regulating voltage in winding 11. In this manner, that current may be kept at sufficiently high level so that the voltage drop produced by it will guarantee the blocking effect of one of the control bridges, without entailing unnecessary high loss currents at low R. P. M. and low voltage.

With our arrangement it is thus possible to apply the alternating-current tachometer machine in a very simple manner for the production of control quantities that depend upon the velocity, and that do not only depend upon the absolute value of the R. P. M. as regards their magnitude, but permit differentiating between the directions of rotation of the supervised shaft. The regulating quantity produced constitutes a direct potential which is variable both as regards magnitude and direction, and which can be introduced in control circuits just as the velocity-dependent control voltages of a direct-current tachometer dynamo. It goes without saying that the invention is not limited to the fields of application which we have cited, such as remote control, etc., but that it can also be used to advantage in all cases where R. P. M. measurements, R. P. M. comparison, and R. P. M. dependent regulations are to be accomplished by means of electric measuring and control quantities.

We have herein shown and particularly described certain embodiments of our invention and certain methods of operation embraced therein for the purpose of explaining its practice and showing its application, but it will be obvious to those skilled in the art that many modifications and variations are possible and we aim therefore to cover all such modifications and variations as fall within the scope of our invention which are defined in the appended claims.

What we claim as new and desire to secure by Letters Patent of the United States is:

1. Speed responsive apparatus comprising an alternating current tachometer generator having a pair of windings displaced from each other in space phase, a full wave rectifier having a pair of unidirectional current passing terminals and a pair of current blocking terminals, a reactor and a pair of output terminals at which a voltage is to be responsive to the speed and direction of rotation of the tachometer generator, one of said generator windings being connected in series with the reactor and the rectifier through its unidirectional current passing terminals, and the other winding of the generator being connected in series with said output terminals and said rectifier through its current blocking terminals.

2. Speed responsive apparatus comprising a generator having a pair of windings displaced in space phase, full wave rectifier means with two sets of terminals, one set being adapted to pass current and the other to oppose the passage of current normally, a reactor connected in series with one of the generator windings and the current passing terminals of the rectifier means, a pair of output terminals, and means for applying a voltage representing the voltage of the other of said generator terminals in series with the current opposing terminals of the rectifier means.

3. Speed responsive apparatus comprising a pair of output terminals, a generator adapted to be driven at a speed which is measured and having a pair of output windings displaced in phase from each other, a pair of full wave rectifiers each having a pair of unidirectional current passing terminals and a pair of current opposing terminals, a reactor connected in series with one of the generator windings and the unidirectional current passing terminals of the rectifier, the latter being so connected as to pass current on alternate half waves of the alternating current wave of said winding, means for supplying a voltage representing the voltage of the other of said generator windings, said means being connected in series with the current opposing terminals of the two rectifiers, the said output terminals being connected from a point between the two rectifiers in said current opposing circuit to an intermediate point in the last-mentioned voltage-supplying means.

4. Speed responsive apparatus comprising an alternating current generator having a pair of windings displaced in space phase, a pair of full wave rectifiers each having unidirectional current passing terminals and current opposing terminals, a reactor, a plurality of resistors, two of said resistors being connected between one of the unidirectional current passing terminals of one rectifier and a unidirectional current passing terminal of opposite polarity of the other rectifier, two of the resistors being connected between the remaining two unidirectional current passing terminals, conductors connecting one of the generator windings and the reactor in series between the common point of one pair of series resistors and the common point of the other pair of series resistors, a pair of conductors supplying a voltage representing the voltage of the other of said generator windings, one of said pair of conductors being connected to the current opposing terminals of one of the rectifiers, the other of said pair of conductors being connected to one of the opposing terminals of the other rectifier, an output terminal for the apparatus connected to the remaining two current opposing terminals of the rectifier and a second output terminal for the apparatus connected to a point at a potential intermediate the potentials at the ends of the conductors which are connected to the first-mentioned current opposing terminals.

5. Speed responsive apparatus comprising an alternating current generator having a pair of output windings arranged in displaced phase, a reactor, a full wave rectifier having a pair of unidirectional current passing terminals of opposite polarity connected in series with the reactor and one of the windings of said generator, a second full wave rectifier having a pair of unidirectional current passing terminals, resistance interposed between one of the terminals of one of said rectifiers and a terminal of opposite polarity in the other of said rectifiers, resistance interposed between the remaining terminals of the rectifier, each of said rectifiers also having a pair of current opposing terminals, means for applying a voltage corresponding to the voltage of the other of said generator windings between a current opposing terminal of one rectifier and a current opposing terminal of the other rectifier, and output terminals one of which is connected at an intermediate point in said last-mentioned voltage supply means, and the other of which is connceted to the two remaining current opposing terminals of the rectifiers.

6. Speed responsive apparatus of the type set forth in claim 1 employing a rectifier consisting of elements having an appreciable resistance in the current conducting direction.

7. Speed responsive apparatus of the type set forth in claim 1 employing a reactor having a core composed of saturable magnetizable material.

8. Alternating voltage generating means having a movable element, means for inducing a voltage having a space lag behind the voltage of the first-mentioned means, so that peak values of the voltages occur with the movable element in different positions, a normally blocked current-passing device connected in series with the first-mentioned voltage generating means and having a pair of output terminals, and having a pair of control terminals for rendering the current-passing device effectively conducting when energized with a given polarity, means for energizing said control terminals from the space-lag voltage-generating means, and means for introducing a time lag between said last-mentioned voltage of the energization of the rectifier.

9. In combination, an alternating-current generator with relatively movable elements generating a voltage having a peak value at a predetermined relative position of the movable elements, means for generating an alternating voltage displaced in space phase from the voltage of said generator, so that its peak value occurs at a different relative position of the movable elements, a polarized current-responsive device, a rectifier having rectifying elements connected in opposition in series with said generator and said polarized current-responsive device, and having a pair of control terminals for rendering said rectifier effectively conducting when the control terminals are energized, means for connecting said second voltage generating means to said control terminals, and means for inducing a displacement in time phase between the voltage of said means and the energization of said control terminals.

10. In combination, alternating voltage generating means with relatively movable elements generating a voltage having a peak value at a predetermined relative position of the movable elements, means for inducing an alternating voltage with a peak value occurring at a different relative position of the movable elements, a normally blocked current passing device connected in series with the first-mentioned voltage generating means and a pair of output terminals and having a pair of control terminals for rendering the current passing device effectively conductive when energized with a given polarity, means for energizing said control terminals from the voltage inducing means, and means for introducing a displacement in the time phase between the voltage of said last-mentioned means and the energization of said control terminals.

RUDOLF BUCH.
FRIEDRICH HAEMMERLING.